Sept. 9, 1930.                    W E. SNYDER                    1,775,625
                                  TERMINAL VALVE
                        Filed April 29, 1927         2 Sheets-Sheet 1

Inventor
W Earl Snyder
By Wood & Wood
Attorneys

Sept. 9, 1930.  W E. SNYDER  1,775,625
TERMINAL VALVE
Filed April 29, 1927   2 Sheets-Sheet 2

Inventor
W Earl Snyder

By
Word c Ward
Attorneys

Patented Sept. 9, 1930

1,775,625

UNITED STATES PATENT OFFICE

W EARL SNYDER, OF NORWOOD, OHIO, ASSIGNOR TO THE EDNA BRASS MANUFACTURING COMPANY, OF CINCINNATI, OHIO, A CORPORATION OF OHIO

TERMINAL VALVE

Application filed April 29, 1927. Serial No. 187,581.

The invention relates to automatically operated check valves for injecting lubricant into a chamber containing pressure referred to in the trade as a terminal valve, particularly used in connection with force feed lubricator systems for locomotive engine cylinders and valve chambers.

An object of the invention is to provide a check valve, diaphragm mounted, so as to be operated and controlled by the pressure of the lubricant in a chamber at one side of the diaphragm and opposingly by the pressure of the fluid in a chamber at the opposite side of the diaphragm and arranged that the pressure in the lubricant chamber must be raised to a point slightly in excess of the steam pressure in the cylinder or chamber to which the lubricant is to be delivered so that the lubricant will be forced or injected into the chamber containing pressure. The use of the pressure of steam and lubricant in relatively opposing sides of the diaphragm for operating and controlling the valve uniformly distributes the pressure on the diaphragm surfaces avoiding unduly straining the diaphragm. In the types of terminal valves in which a spring is used as a counter pressure to the lubricant pressure for seating the valve under the predetermined pressure in excess of the maximum steam pressure any variation in steam pressure has no influence on the valve. The parts under such condition are always under a maximum strain and the pressure of the lubricant must always be raised to a pre-determined degree for its discharge while in the present instance the pressure degrees vary with the working requirements or variation of steam pressure. The lower the working pressure the less wear on the force pump delivering the oil to the valve as when the locomotive is drifting. The pressure the force feed pump works against, varies with the steam pressure thus producing constant variation in pressure between steam and oil. The lubricant can be delivered to the steam cylinder under a pressure below the maximum boiler pressure as when the locomotive is not using steam as the excess pressure in oil chamber of the valve is vented into the valve chambers or cylinders of the engine at the time most needed.

Many other advantages will be more readily apparent from the description of the accompanying drawings showing the preferred embodiments of the invention, in which.

Figure 1:
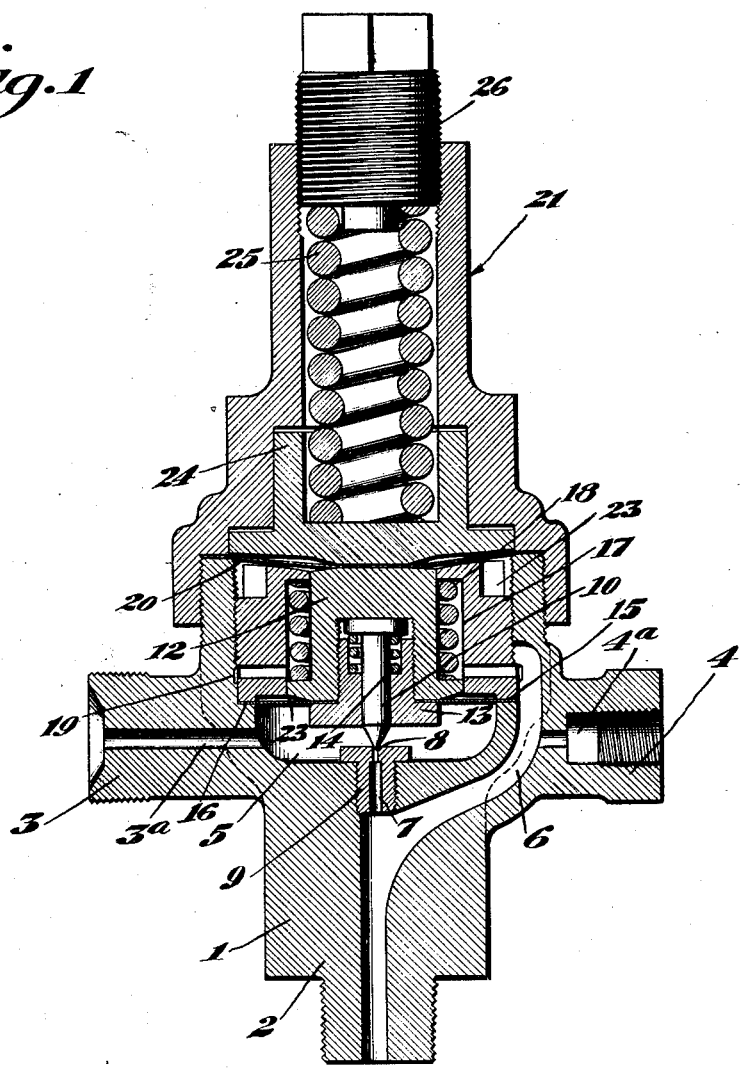
Figure 1 represents a central vertical section through the improved terminal check valve for force feeding lubricator systems.

The valve primarily is utilized in connection with force feed lubricator systems of locomotive engine cylinders or steam chests for periodically injecting the lubricant into the cylinder or chamber containing pressure. In the system an oil pump operated either by the engine or a suitable part of the movable machinery conveys and forces the lubricant into a chamber of the valve wherein it is held against discharge until it reaches a pre-determined pressure which is greater than the steam pressure in the cylinder or chamber to be lubricated. After the lubricant in the valve chamber reaches a pressure in excess of the steam pressure, the valve is automatically opened and the oil discharged through a restricted port into the steam cylinder. The opening of the valve and the discharge of the lubricant effects sufficient relief in the valve chamber so as to cause a differential in the pressure to reverse the conditions, allowing the valve to again be automatically closed. Valves of this character are in general commercial use upon locomotive engines although in the prevailing type of terminal valve employed the lubricant controlling means is not effected by the steam pressure of the part to be lubricated, so that any variation in steam pressure in the cylinder or steam chest does not have any influence upon the operation of the valve, the valve mechanism being definitely set to operate at a pre-determined lubricant pressure which of course exceeds that of the steam pressure so that the discharged lubricant is forced into the steam cylinder when the valve is open.

In the present invention, the lubricant controlling valve in normal operation is governed by the pressure of steam in the engine cylinder so that the valve will open at varying pressures governed by the degree of pressure in the steam cylinder. Such control is of advantage as it enables a variation in the supply of lubricant delivered by a change in timing or periodicity of operation. The oil pump is usually operated under varying conditions governed by the rate of travel of the locomotive, which traveling conditions to a degree result in causing a change in steam pressure, as for instance in going up and down grades, or where it is desirable to change the timing of the valve so that the oil discharge intervals are variable to more accurately satisfy the requirements.

Referring to the drawings, 1 indicates the body of the valve of T-design providing a lower vertical threaded nipple extension 2 for connecting the valve into an opening in the engine cylinder or steam or pressure chamber to be lubricated and the oppositely disposed nipple extensions 3, 4, the nipple 3 for making the lubricant supply connection which is provided with a passage 3A communicating with the oil chamber 5 centrally within the valve body and the second nipple 4 for making an auxiliary steam connection connecting with the boiler supplying the engine cylinder. The nipple 4 is provided with a passage 4A communicating with a passage 6 which leads downwardly and centrally of the body for communicating with the steam cylinder and with a passage 7 and valve control port 8 formed in the removable valve seat bushing 9, the lubricant passing from the lubricant chamber 5 through said valve control port 8 into the passages 7 and 6 when the needle valve 10 is open.

The needle valve 10 is slidably mounted within a guided follower 12 by means of a flanged bushing 13 screw threaded into the lower end of the follower 12. The stem of the valve extends through a bore in the bushing, the bushing being counterbored at the head end of the valve to receive a compression spring 14 engaging with the head of the valve. The spring normally holds the stem within a retracted position within the follower and is yieldingly mounted so as not to be abruptly unseated. The valve, however, may be rigidly mounted in place.

The follower is fixed to one side of a diaphragm 15, the diaphragm providing a closure for the oil chamber 5 and is secured to the follower by the flanged end of the bushing 13. The diaphragm marginally seats upon an annular shoulder 16 formed in the valve body 1 and is engaged and held secure by a collar 17 screw threaded into the body, the collar centrally being counter-bored for guidingly sustaining the follower 12. The follower at its lower end is annularly flanged to provide a shoulder against which a spring 18 bears, the spring being disposed about the follower within the bore of the collar 16 and is thus housed between the follower and collar and functions to apply a valve seating pressure. The valve body internally is annularly grooved above the diaphragm seating shoulder 16 to provide an annular passage 19 communicating with a branch of passage 6 by-passing the lubricant chamber 5 so that the upper side of the diaphragm 15 is subject to the pressure of the steam from the steam cylinder to which the valve connects, augmented by the force of the spring 18 to close the valve 10 in opposition to the oil pressure in the chamber 5, the spring 18 supplying a predetermined excess pressure above the prevailing steam pressure, so that the pressure of the lubricant in the chamber must exceed the maximum back pressure from the cylinder before the valve opens. The prevailing pressure acts against either of the opposite sides of the diaphragm controlling the direction of movement of the diaphragm for automatically opening and closing the valve, the spring 18 supplying the necessary excess pressure over the steam pressure, so that the combined pressure of the steam and spring must be overcome by the oil pressure in the oil chamber before the valve is opened and under such oil pressure the oil will be forced into the cylinder against the cylinder back pressure when the valve is opened.

A second diaphragm 20 seats against the annular upper edge of the valve body and is held secure by a tubular bonnet hub end 21 screw-threaded upon the body. The diaphragms 15 and 20 are thus suitably spaced apart to provide a steam chamber within the body against the oil chamber with the collar and valve follower disposed in the chamber. The diaphragm 20 is of increased diameter over the diaphragm 15 and therefore exposes a greater area to the pressure in the steam chamber 23 and under the steam pressure it is deflected upwardly against the follower or abutment 24 slidingly supported in the bonnet for relieving the valve follower of the pressure of a spring 25 within the bonnet, one end of the spring 25 engaging into the follower 24 and the opposite end against an adjusting screw or plug 26 screw-threaded into the upper end of the bonnet, the spring 25 being provided for applying a determined pressure against the valve follower to close the valve and maintain the same closed when the steam pressure is cut off to the chamber 23 as when the engine is idle. The spring 25 being primarily employed for applying a determined valve closing pressure when the engine is idle does not apply any pressure upon the valve when the terminal valve is in operation.

Figure 2:
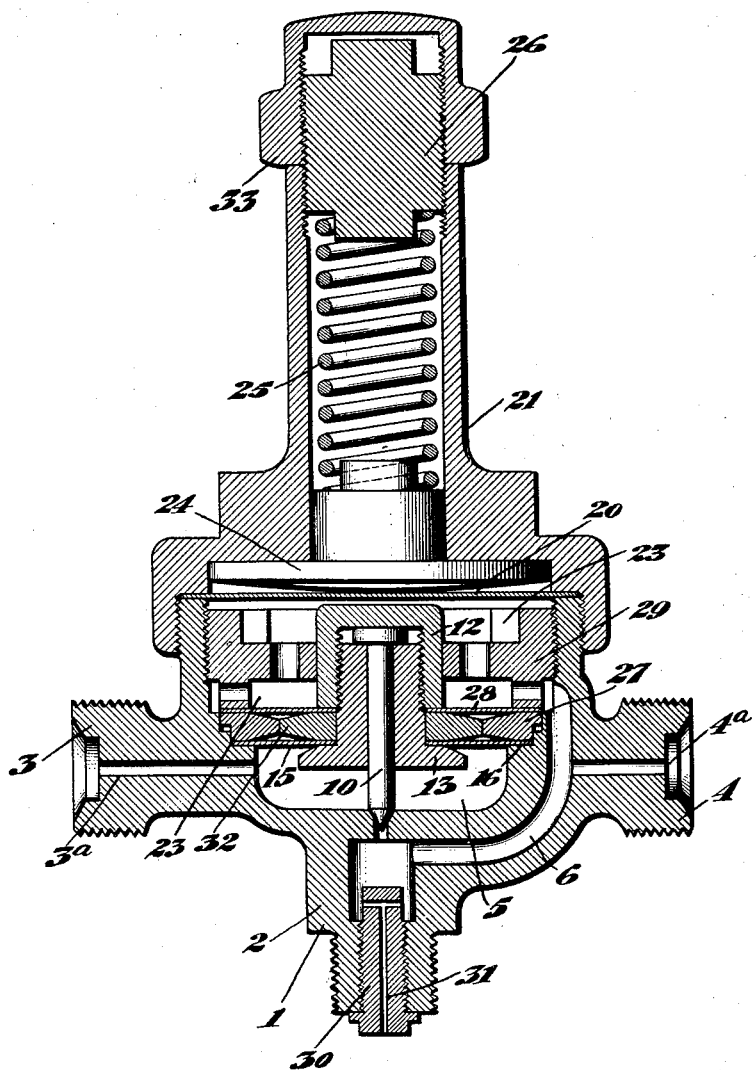
Figure 2 is a central section through a modified form of valve in which differential diaphragms are employed for mounting the needle valve.

In the modification shown in Figure 2, the valve follower is secured to a pair of diaphragms and the needle valve is rigidly secured to the follower. The valve follower is secured to a diaphragm 15 engaged against an annular shoulder in the valve body, the diaphragm forming a closure for the oil chamber 5, and is held secure by an annulus 27, its underside engaging upon the diaphragm while the opposite side is in engagement with a diaphragm 28 secured in position by a collar or lock-nut 29, screw-threaded within body. The upper face of the diaphragm 28, is exposed to the pressure of the steam within the steam chamber 23, and exposes a greater area to the pressure of the steam than the diaphragm 15, to the pressure of the lubricant in the oil chamber and this differential capacity necessitates raising the lubricant pressure to a point in excess to the steam pressure in the cylinder before the valve is opened. The differential diaphragms thus operate similar to the form shown in Figure 1, in which a single diaphragm is employed with a spring, supplying the determined excess pressure, and for the present purposes the one may be treated as the equivalent of the other.

A second annulus 32 is disposed between the diaphragms 15—28 concentrically within the annulus 27 providing a filler compressingly clamping the follower busher parts to the diaphragm. The annuli are marginally tapered toward their meeting line to allow for the necessary diaphragm movement and relieve the diaphragm from engagement with the edges of the annuli which would tend to rupture the diaphragm metal.

In the form shown on Figure 2, the discharge passage is shown as provided with a choke plug 30, having a T shaped passage 31. This provides means for further restricting the communication between the valve and the steam cylinder. The bonnet as shown is provided with a cap 33, screw threaded upon the plug 26, for guarding the plug, necessitating the removal of the cap before a plug adjustment can be made, so that the operator is not tempted to make unnecessary adjustments, the spring being usually adjusted for a definite tension and working pressure at the time of installation of the valve.

As shown in the drawing, the valve is in its closed position and the parts occupying a position as will be the case when the locomotive engine is idle with no steam pressure in the steam chamber 23. As soon as a pressure in the steam chamber reaches a degree sufficient to move the diaphragm 20 the spring 25 will be correspondingly compressed so that it will have no influence upon the valve follower 12. The diaphragm under such condition would be slightly spaced or free from engagement of the upper end of the valve follower 12 and the valve would be held closed by the combined pressure of the steam and the spring 18.

Having described my invention, I claim:

1. A valve for a force feed lubricator system, the valve controlling the discharge of lubricant under the pressure for delivery into a steam cylinder or the like, comprising, a valve body formed with an oil chamber having a valve control restricted discharge port, a steam chamber, and a movable spring pressed abutment normally exposed to the pressure of the steam in the steam chamber for closing said valve under a predetermined pressure when said abutment is not influenced by the pressure in said steam chamber.

2. In a terminal check valve, a valve body, a diaphragm structure dividing said body into a fluid pressure chamber and an oil pressure chamber, the oil chamber having a valve controlled and restricted discharge port, a valve operatively connected with said diaphragm structure to close said discharge port, the parts being so associated that the oil pressure tends to open said valve and the fluid pressure to close said valve, a second diaphragm structure within the body influenced by the pressure in said fluid pressure chamber and under a counter-pressure for operating the said first diaphragm structure for closing said valve under a pre-determined pressure when prevailing over the pressure in said fluid pressure chamber.

3. In a terminal check valve for controlling the discharge of lubricant under a pre-determined pressure, a valve body formed with a lubricant chamber having a valve controlled and restricted discharge port, a fluid pressure chamber in said body, a valve for closing said port exposed to relatively opposing pressures in said lubricant and fluid pressure chambers, with the pressure in said fluid chamber closing said valve until the pressure in said oil chamber prevails over the fluid pressure which opens the valve, and tension means for closing said valve under a pre-determined pressure ineffective when the pressure in said fluid pressure chamber prevails over the valve closing pressure of said tension means.

4. In a terminal check valve for controlling the discharge of lubricant under a pre-determined pressure, a valve body formed with a lubricant chamber having a valve controlled and restricted discharge port, a fluid pressure chamber in said body, a diaphragm suspended valve for closing said port the diaphragm exposed to relatively opposing pressures in said lubricant and fluid pressure chambers, the pressure in the lubricant chamber opening the valve, and the pressure in the fluid pressure chamber closing the valve, when the pressure in the one prevails over the other, and tension means including a diaphragm influenced by the pressure in said fluid pressure chamber for closing said valve under a pre-determined pressure when the pressure of said tension means prevails over the counter-pressure in said fluid pressure chamber.

In witness whereof, I hereunto subscribe my name.

W EARL SNYDER.